United States Patent [19]

Petersen

[11] Patent Number: 4,861,115
[45] Date of Patent: Aug. 29, 1989

[54] ELECTRICALLY-CONTROLLED MOTOR VEHICLE BRAKE SYSTEM

[75] Inventor: Erwin Petersen, Wunstorf, Fed. Rep. of Germany

[73] Assignee: WABCO Westinghouse Fahrzeugbremsen GmbH, Hanover, Fed. Rep. of Germany

[21] Appl. No.: 261,792

[22] Filed: Oct. 24, 1988

Related U.S. Application Data

[63] Continuation of Ser. No. 68,001, Jun. 29, 1987, abandoned, which is a continuation of Ser. No. 818,292, Jan. 13, 1986, abandoned.

[30] Foreign Application Priority Data

Jan. 16, 1985 [DE]  Fed. Rep. of Germany ....... 3501179

[51] Int. Cl.$^4$ .......................... B60T 8/38; B60T 13/68
[52] U.S. Cl. ........................................ 303/15; 303/14; 303/100; 303/118; 303/119; 303/28; 303/69; 303/DIG. 4; 303/22.1; 303/50
[58] Field of Search ................................. 303/15, 2-3, 303/100, 116, 101, 113, 119, 118, 117, 9, 50-56, 61-63, 68-69, 7-8, 13-14, 16, 17, 18, 22.1-22.8, 92, 6.01, 9.66, 9.76, 9.61, DIGS. 1-4, 91, 96, 110, 28, 111, 40; 188/195; 251/14, 129.03

[56] References Cited

U.S. PATENT DOCUMENTS

| | | | |
|---|---|---|---|
| 1,850,609 | 3/1932 | Thomas . | |
| 3,240,534 | 3/1966 | Stelzer . | |
| 3,316,031 | 4/1967 | Henry-Biabaud | 303/50 |
| 3,507,542 | 4/1970 | Cannella | 303/7 |
| 3,519,312 | 7/1970 | Cruse | 303/50 X |
| 3,549,212 | 12/1970 | Leiber | 303/DIG. 4 |
| 3,580,646 | 5/1971 | Ternert | 303/54 X |
| 3,606,494 | 9/1971 | Frank et al. | 303/52 |
| 3,639,009 | 2/1972 | Klein et al. | 303/119 |
| 3,746,400 | 7/1973 | Cruse | 303/68 X |
| 3,768,877 | 10/1973 | Siebold | 303/52 |
| 3,809,441 | 5/1974 | Klimek | 303/52 |
| 4,010,983 | 3/1977 | Coupland | 303/52 X |
| 4,251,114 | 2/1981 | Belart | 303/52 X |
| 4,344,138 | 8/1982 | Frasier | 364/426 |
| 4,416,347 | 11/1983 | Bertling et al. | 303/110 X |
| 4,436,347 | 3/1984 | Stumpe | 303/52 X |
| 4,462,642 | 7/1984 | Leiber | 303/119 |
| 4,482,191 | 11/1984 | Beck et al. | 303/52 |
| 4,557,527 | 12/1985 | Stumpe | 303/15 |
| 4,568,129 | 2/1986 | Stumpe | 303/15 X |
| 4,576,416 | 3/1986 | Muller et al. | 303/15 |
| 4,585,278 | 4/1986 | Grauel et al. | 303/15 X |
| 4,585,279 | 4/1986 | Doto | 303/15 X |
| 4,603,919 | 8/1986 | Gravel et al. | 303/15 X |
| 4,616,881 | 10/1986 | Müller et al. | 303/15 X |
| 4,632,466 | 12/1986 | Grauel et al. | 303/118 X |
| 4,671,578 | 6/1987 | Rothen et al. | 303/15 |

FOREIGN PATENT DOCUMENTS 0103716  3/1984  European Pat. Off. .
0110119  6/1984  European Pat. Off. .

(List continued on next page.)

Primary Examiner—Douglas C. Butler
Attorney, Agent, or Firm—Jr. Ray

[57] ABSTRACT

An electrically-controlled motor vehicle brake system, which responds to fluid pressure supplied from a common source. The system includes an electronic control system to process information and issue brake commands. A brake cylinder, to apply and release brake pressure on each respective wheel brake, receives pressure from at least one solenoid valve, connected to receive pressure from the source. The pressure is communicated to the brake cylinder of each respective wheel brake upon receipt of a control signal from the control system. A brake power selector includes both a pedal-operated brake valve, connected on an input side to receive pressure from the source, and connected on an output side to a ventilation portion of the solenoid valve for modulating the brake pressure, and an electrical frequency selector is connected to provide an input signal to the electronic control system upon actuation by an operator of such vehicle during a brake application.

12 Claims, 4 Drawing Sheets

FOREIGN PATENT DOCUMENTS

| | | |
|---|---|---|
| 0187901 | 7/1987 | European Pat. Off. . |
| 1131724 | 6/1962 | Fed. Rep. of Germany . |
| 2062533 | 7/1971 | Fed. Rep. of Germany . |
| 2065815 | 3/1976 | Fed. Rep. of Germany . |
| 2541416 | 3/1977 | Fed. Rep. of Germany . |
| 3149110 | 6/1983 | Fed. Rep. of Germany . |
| 3212930 | 10/1983 | Fed. Rep. of Germany ........ 303/15 |
| 3215475 | 11/1983 | Fed. Rep. of Germany . |
| 3230970 | 2/1984 | Fed. Rep. of Germany . |
| 3230971 | 4/1984 | Fed. Rep. of Germany . |
| 3337800 | 5/1984 | Fed. Rep. of Germany . |
| 3344301 | 6/1984 | Fed. Rep. of Germany . |
| 35012179 | 7/1986 | Fed. Rep. of Germany ... 303/DIG. 3 |
| 2544268 | 4/1984 | France . |
| 2131508 | 6/1984 | United Kingdom . |

ELECTRICALLY-CONTROLLED MOTOR VEHICLE BRAKE SYSTEM

This is a continuation of co-pending application Ser. No. 07/068,001, filed on June 29, 1987, now abandoned, which is a continuation from the parent application Ser. No. 06/818,292, filed Jan. 13, 1986, now abandoned.

BACKGROUND OF THE INVENTION

The present invention relates in general to a motor vehicle braking system and, more particularly, the invention relates to an electrically-controlled fluid pressure responsive motor vehicle braking system.

In an electrical brake system, especially for those used on utility vehicles, the brake cylinders are activated by a pressure medium, which is generally compressed air. But the brake pressure, in this application, is not controlled by means of a control pressure graduated by a pedal-operated brake valve. Instead, the brake pedal is equipped with an electrical command value selector, for example, a potentiometer. The output signal of the selector is transmitted to an electronic system. In the electronic control system, the signal can be modified by additional devices, which can operate, for example, as a function of the load (ALB - automatic load-controlled braking), as a function of the wheel skid (anti-locking brake system), and/or in harmony with supplemental brakes (retarders).

The resulting braking system is transmitted to solenoid valves (modulators) which control the feed of the pressure medium to the brake cylinders. Such a solenoid valve can be constructed according to various principles (digital or analog). In place of a simple control, the braking pressure can also be set to a desired value. In this case, the actual pressure is generally monitored and indicated by a pressure sensor.

Such electrical brake systems have the advantage of achieving a rapid and more precisely-controlled braking. In addition, the hysteresis of the pedal-operated brake valve and other control valves (automatic load-controlled brake, etc.) can be eliminated in such systems.

Naturally, there are high safety requirements for braking equipment. Thus, for example, international standards specify that even if a failure should occur in the electrical system, the electronic system or a modulator of an electronically-controlled service brake installation on a motor vehicle, a limited, so-called emergency or residual braking action must be capable of being achieved. This interational safety requirement necessitates at least a two-circuit design of the service brake installation.

As an alternative to a two-circuit electronic system and electrical voltage feed - by analogy to hydraulic back-up brake installations, like those which are common in the USA and which are known in the prior art-it is conceivable to provide a pneumatic redundance for a single-circuit electronic system and voltage supply. For this purpose, the brake pedal, in addition to the electrical command value selector, also activates an ordinary pressure modulation valve. By means of the modulated pressure, if there is a total failure of the electronic or electrical system, the brake cylinder can be controlled directly by means of multiway valves, as has been taught by the prior art, or indirectly by means of appropriate modulators, which has also been shown in the prior art. Even in case of a failure, the wheel brakes can thereby be activated purely pneumatically. A disadvantage of these solutions is that the pneumatic circuit, which is inactive in normal operation, must be monitored by at least one additional pressure sensor.

SUMMARY OF THE INVENTION

This invention teaches an electronically-controlled motor vehicle brake system. The brake system responds to fluid pressure supplied from a common source positioned on a motor vehicle. The braking system includes an electronic control system, positioned on the vehicle, to process various information and issue brake commands according to such supplied information. A brake cylinder, associated with each respective wheel brake on the vehicle, to apply and release each such respective wheel brake, receives fluid pressure from at least one solenoid valve means, connected to receive fluid pressure from the source. The fluid pressure is communicated to the brake cylinder of each respective wheel brake upon receipt of an appropriate control signal from the control system. A brake power selector, positioned on the vehicle, includes both a pedal-operated brake valve means, connected on an input side thereof to receive fluid pressure from the source, and connected on an output side thereof to a vent portion of the solenoid valve means for modulating the braking pressure, and an electrical frequency selector is connected to provide an input signal to the electronic control system upon actuation by an operator of such vehicle during a brake application.

OBJECTS OF THE INVENTION

It is, therefore, an object of the present invention to provide an electronically-controlled brake system for a motor vehicle, which incorporates therein an inexpensive redundant fluid pressure control feature.

Another object of the present invention is to provide an electronically-controlled brake system, in which the pedal-operated brake valve operates directly on a vent portion of a solenoid valve, to provide such redundant fluid pressure control.

Still another object of the present invention is to provide an electronically-controlled brake system, in which a solenoid valve can be vented by a redundant pressure, which is lower by a predetermined relative or absolute pressure differential.

Yet another object of the present invention is to provide an electronically-controlled brake system, in which improved control can be achieved, even with finely graduated partial brake applications.

These and various other objects and advantages of the present invention will become more apparent to those persons skilled in the vehicle braking art, from the following more detailed description, when such description is taken in conjunction with the attached drawings and the appended claims.

BRIEF DESCRIPTION OF THE INVENTION

Figure 1:
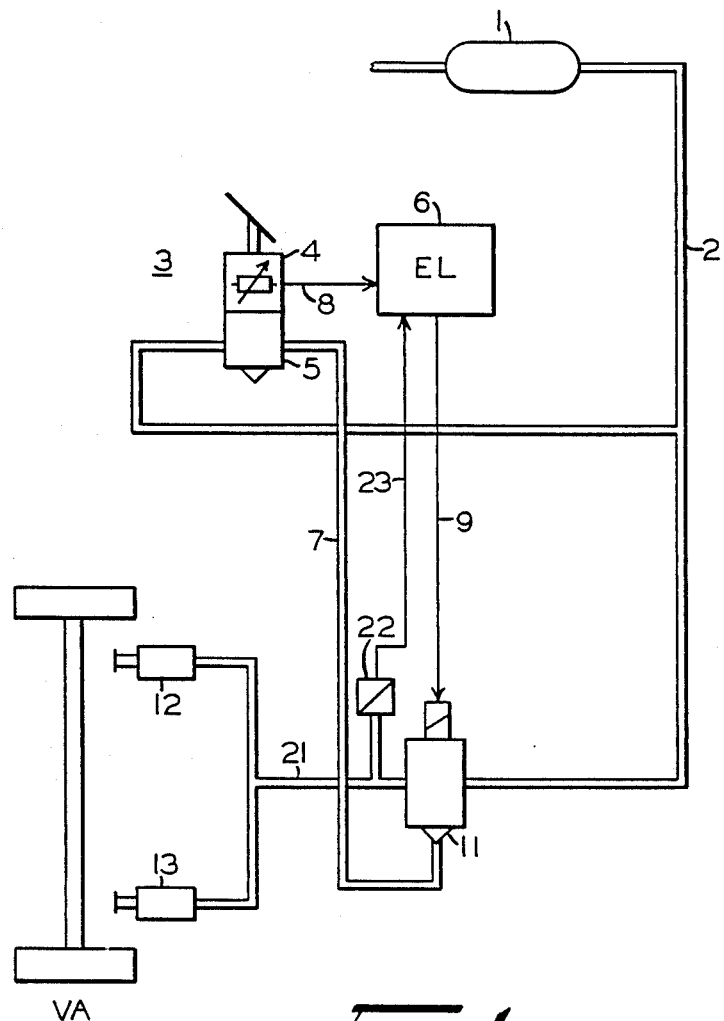
FIG. 1 is a schematic diagram, showing the basic elements of the present invention.

As shown in FIG. 1, a compressed air reservoir, generally designated 1, of a utility vehicle, is connected, via a line 2, to a pedal-operated brake valve 5 on a pressure inlet side thereof and a solenoid valve, preferably a modulator valve, generally designated 10 at a pressure inlet port. The pedal-operated brake valve 5 is one part of a braking power selector 3. The braking power selector 3 is also equipped with an electrical nominal frequency selector 4, which is connected, via a line 8, with an electronic control system 6. One or more output lines 9, from the electronic control system 6, are connected to one or more activation coils of the solenoid valve 10.

The output connection of the pedal-operated brake valve 5 is connected, via a line 7, to the vent portion connection 11 of the solenoid valve 10. The pressure output of the solenoid valve 10 is connected, via a line 21, to the brake cylinders 12 and 13 of a brake circuit (here the front axle VA) and to a pressure sensor 22. The pressure sensor 22 is connected, via a line 23, with the electronic control system 6. If desired, the pressure sensor 22 can be integrated into the solenoid valve 10 (modulator).

In operation, when the brake is activated, the electrical command value selector 4 transmits a signal to the electronic control system 6. This signal is processed in the electronic control system 6, and, if desired, signals from other devices (not shown) in FIG. 1 are also processed here, such as, automatic load-controlled brakes and anti-locking systems or retarders, and are logically interconnected within electronic control system 6. The solenoid valve 10 is driven by the resulting output signal to correspond to the activation of the brake. With the output pressure set in this manner on the line 21, the brake cylinders 12 and 13 are activated.

The pressure sensor 22 transmits a signal value, representative of the brake pressure to the electronic control system 6, and thus closes the electropneumatic control circuit.

If the solenoid valve 10 is, for example, a proportional valve, then the pressure sensor 22 may not be necessary for operation of the basic control circuit. It can then be used to monitor the circuit or to improve the control characteristic.

In the braking power selector 3, a braking pressure, modulated as usual, is simultaneously produced by a pedal-operated valve 5. The pressure produced by pedal-operated valve 5 is conducted to the vent portion 11 of the solenoid valve 10. When the brake pressure increases and is held constant, the solenoid valve 10, which is then closed on the evacuation side, is not affected. If, however, the braking command value is reduced by the driver, then the solenoid valve 10 is vented via the line 7 and the vent connection of the pedal-operated valve 5.

The pressure conditions are set so that the output pressure of the pedal-operated valve 5, on the line 7, is, for example, 1 bar lower than the output pressure of the solenoid valve 10 on the line 21. A smoother application of the brake is achieved as a result of the throttled venting of the solenoid valve 10.

Figure 2:
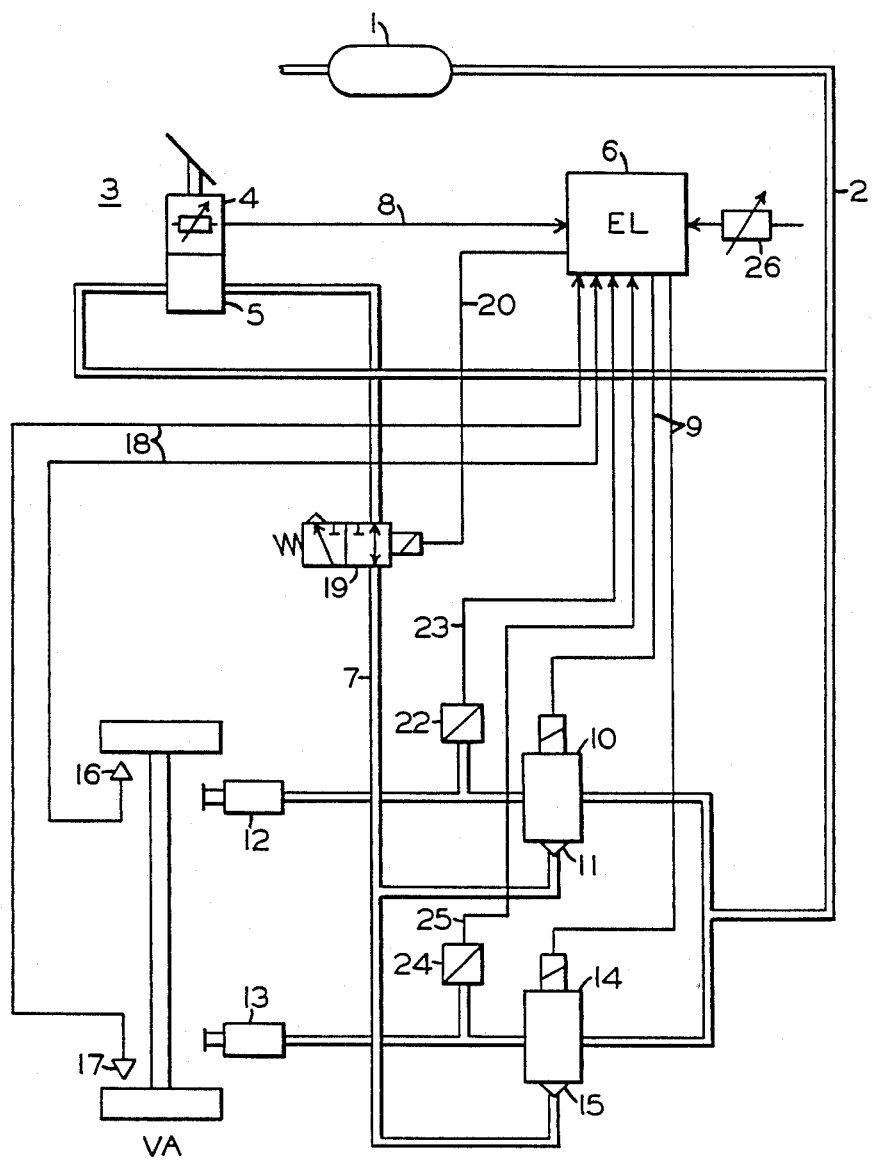
FIG. 2 is a schematic diagram, showing a presently preferred embodiment of the invention, having an anti-locking system incorporated into a vehicle brake system.

FIG. 2 shows a brake system, which also contains an anti-locking system (ABS). In this embodiment, signals relative to the wheel velocities, are fed (in a known manner) to the electronic control system 6 via wheel sensors 16 and 17. To be able to individually exercise a controlled braking of both wheels of a brake circuit (here the front axle VA), there are two solenoid valves 10 and 14, whose pressure inputs are connected via the line 2 to the compressed air reservoir 1. The solenoid valves 10 and 14 can be controlled, via lines 9, from the electronic control system 6. The brake pressure released is measured by pressure sensors 22 and 24, and reported to the electronic control system 6 via lines 23 and 25.

In contrast to the brake system illustrated in FIG. 1, in the vent line 7, common to the two solenoid valves 10 and 14, there is a cutoff valve 19, which can be controlled via a line 20 from the electronic control system 6. The cutoff valve 19 is preferably designed as a solenoid valve and is normally open. Only in a special case, such as a braking controlled by the anti-locking system, in the cutoff valve 19 driven by a signal from the electronic control system 6. The venting of the solenoid valves 10 and 14 is not thereby accomplished by means of the pedal-operated valve 5, but directly into the atmosphere. The rapid venting processes, which are necessary for a controlled braking, are therefore guaranteed to below the pressure value specified by the driver.

The cutoff valve 19 can also be modulated if, on account of superimposed retarder braking action, the service braking action is to be withheld, or if the driver wishes to release the brakes very rapidly. This is then recognized by the electronic control system 6 and the cutoff valve 19 is switched, via the line 20, to vent as necessary.

Likewise, the cutoff valve 19 can then be reversed if the brake pressure in an unloaded or partly-loaded vehicle is to be reduced corresponding to an axle load value indicated by a sensor 26 from the braking power specified by the driver.

Specifically for automatic load-controlled braking controls with a steep-drop characteristic, it may be advantageous to replace the 3/2-way cutoff valve 19, in a known manner, by a 2/2-way holding valve and a 2/2-way venting valve (not shown). Then, only the holding valve need be controlled, once the redundant pressure released by the pedal-operated brake valve 5 reaches and exceeds the pressure set by the load-controlled braking system. That is only the case, however, in a relatively low number of brake activations. Such a configuration reduces the consumption of air and the magnet activations for the cutoff valve 19.

If the electrical voltage supply, the electrical system, the electronic control system 6, or the solenoid valves 10 and 14 should fail, so that the latter can no longer be electrically controlled, on account of the configuration proposed by the invention, braking is still possible as a result of the redundant pneumatic pressure produced by the pedal-operated valve 5. This pressure travels via the line 7 and the vents 11 and 15 of the solenoid valves 10 and 14 directly to the brake cylinders 12 and 13.

According to the invention, the routing of the redundant pressure, by the solenoid valves 10 and 14, to the brake cylinders 12 and 13 and to the pressure sensors 22 and 24, is designed so that the pressure sensors 22 and 24 can be used both for the electropneumatic braking pressure regulation itself and also so monitor the redundant pneumatic circuit (line 7). The latter is accomplished by the electronic control system 6 and suitable test routines.

Figure 3:
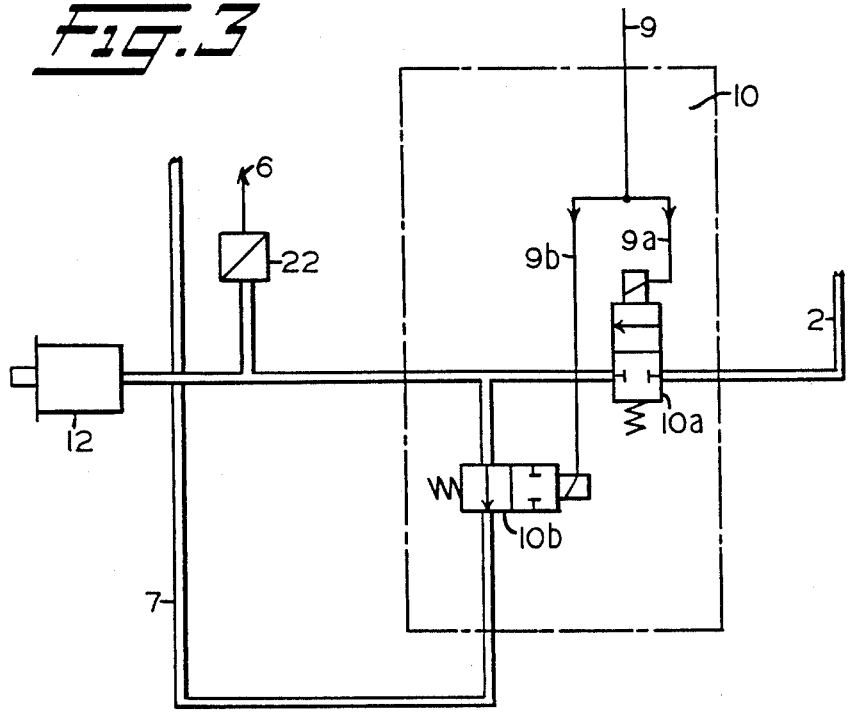
FIG. 3 is a schematic diagram, showing one form of a pressure modulator for the brake system.
Figure 4:
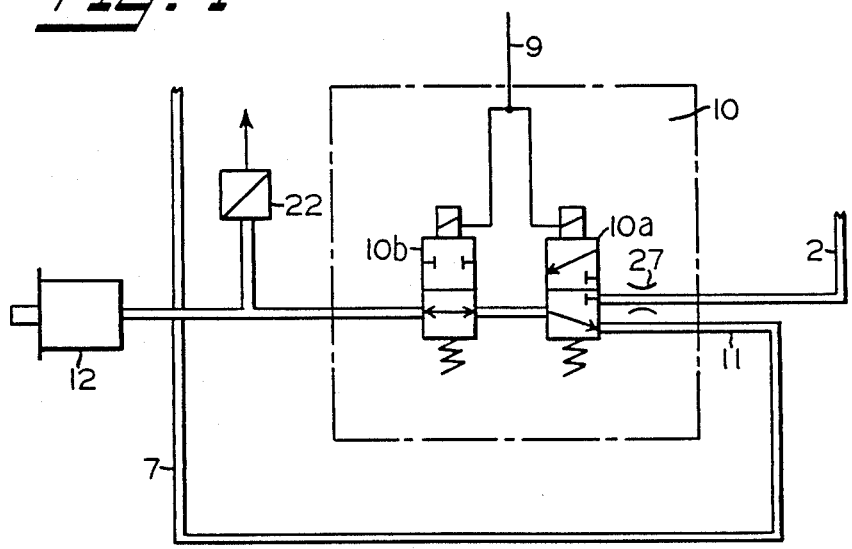
FIG. 4 is a schematic diagram, showing an alternative form of a pressure modulator for the brake system.

FIGS. 3 and 4, as details of FIGS. 1 and 2, show two sample embodiments of the solenoid valve 10 with direct-action 2/2 or 3/2-way solenoid valves 10a and 10b.

As shown in FIG. 3, the solenoid valve 10 (modulator) illustrated in FIGS. 1 and 2, consists of two 2/2-way solenoid valves 10a and 10b. The valves 10a and 10b are controlled by the electronic control system 6 via lines 9, 9a, and 9b. The valve 10, when not operated, contains the reservoir pressure in line 2. The valve 10b, in its normal position, vents the brake cylinder 12 into the line 7. An increase in brake pressure occurs as a result of a prolonged reversal of the outlet valve 10b into the closed position, and, depending on the design of the valve 10a, by a prolonged or timed switching of the inlet valve 10a into the open position. The reversal of only the discharge valve 10b leads to a maintenance of the pressure. A reduction of pressure is appropriately accomplished by not driving either valve. As described above, the reduction in pressure, even with a permanently open discharge valve 10b, takes place with a low gradient, as long as there is a counterpressure at the connection 11 from the pedal-operated valve 5 and the line 7.

If the counterpressure is the same as atmospheric pressure, a steep venting gradient occurs. This is the case if the cutoff valve 19, illustrated in FIG. 2, is reversed by the electronic control system 6, or the redundant pneumatic circuit is out of operation as the result of a failure, for example, in the pedal-operated valve 5, the line 7, or the cutoff valve 19.

According to the invention, this circumstance is used, as described below, to monitor the redundant pneumatic circuit. As is known from anti-locking systems, the electronic control system 6 runs test routines when travel begins, and during travel, to check the electro-pneumatic braking system. These test routines are expanded to monitor the redundant circuit. If brake tests are initiated by the driver by activating the command value selector 3 during travel and during partial brakings, in certain test routines, in spite of the specification of a command value, the solenoid valves 10a and 10b are not driven for a short period of time. Thus, the redundant pressure of the pedal-operated valve 5, which is lower, e. g. 1 bar, by a pressure difference recognized by the electronic control system 6, reaches the brake cylinders 12 and 13 and the pressure sensor 22. If the pressure sensor 22 of the electronic control system 6 reports a redundant pressure, which is "correct" in relation to the desired pressure, the test result is recognized to be in order. Otherwise, the test is repeated and/or a failure indication is given.

In addition, the cutoff valve 19 can be activated for a short period of time within the test routine. If everything is in order, the electronic control system 6 should then recognize a corresponding further reduction pressure and subsequent increase in the redundant pressure.

A test is also performed during brake release operations, wherein another test routine trips the cutoff valve 19 for a short period of time, or for a longer period of time, and the resulting modified (increased) venting gradient is recognized by the elecrtronic control system 6.

As shown in FIG. 4, the solenoid valve 10 (modulator) consists of a 3/2-way valve 10a and a subsequent check valve 10b. An increase in the braking pressure is accomplished by reversing the valve 10a. A reduction is accomplished in the position shown. The pressure is maintained by reversing the check valve 10b. To limit the pressure gradients during control actions, there can be a throttle 27.

The test routines described above for the configuration illustrated in FIG. 3 can be appropriately applied here. The same is true if, for example, the valve 10a in FIG. 4 is designed as a proportional valve, and for other modulator configurations (not shown).

Figure 5:
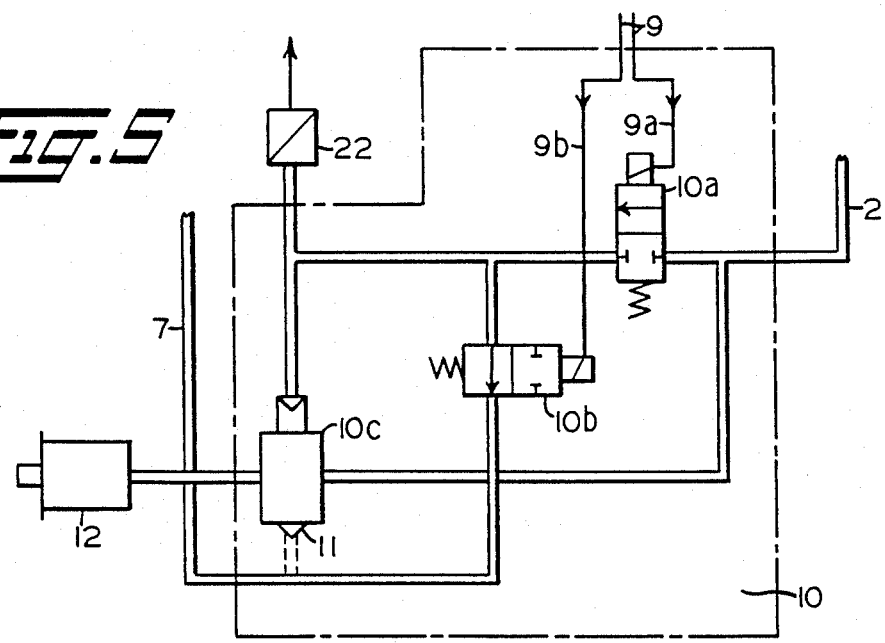
FIG. 5 is a schematic diagram, showing still another alternative form of a pressure modulator for the brake system.
Figure 6:
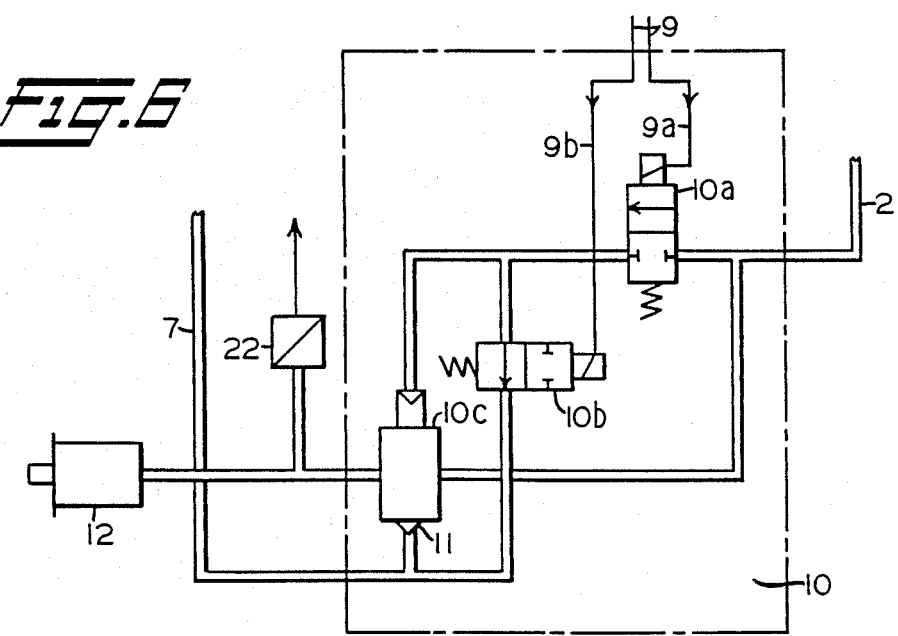
FIG. 6 is a schematic diagram, showing yet another alternative form of a pressure modulator for the brake system.

FIGS. 5 and 6 show, as details of FIGS. 1 and 2, two sample embodiments of the solenoid valve 10 (modulator) with pilot valves.

As shown in FIG. 5, the solenoid valves 10a and 10b pilot a relay valve 10c, shown in FIG. 3, in a known manner. The pressure sensor 22 measures this pilot pressure and feeds its signal to the electronic control system 6. According to the invention, in contrast to redundant pressure shown in FIGS. 1 to 3, the redundant pressure is fed, via the line 7, to the pilot valve 10b, and thence, to the pressure sensor 22 and the relay control chamber of the relay valve 10c. In this instance, not only are the test routines described above to be applied as appropriate, but the advantageous relay action can be used for the redundant circuit. In addition, the redundant circuit (line 7) can also be conected to the main vent 11 of the relay valve 10c.

As shown in FIG. 6, in contrast to FIG. 3, the pressure sensor 22 does not measure the pilot pressure, but the braking pressure released by the relay valve 10c. Here, all that is necessary is a connection of the redundant circuit to the main vent 11 of the relay valve 10c, to guarantee the redundant braking action and the monitoring by the pressure sensor 22. The additional connection of the pilot valve 10b to the line 7 makes it possible to use the relay action for the redundant circuit and improves control comfort during partial brakings.

The configurations illustrated in FIGS. 5 and 6 can be used as appropriate on modulators, in whose place a relay valve 10c, membrane valves, or other piloted valves are used.

Although both presently preferred and alternative embodiments have been shown and described in detail, various other modifications and adaptations can be made by those persons skilled in the art without departing from the spirit and scope of the appended claims.

I claim:

1. An electrically-controlled motor vehicle brake system which responds to pneumatic pressure supplied from a common source positioned on such motor vehicle and which exhausts said pneumatic pressure solely through an exhaust port of a brake valve means forming a portion of said vehicle brake system, said vehicle brake system comprising:
   (a) an electronic control system positioned on such vehicle;
   (b) a brake cylinder associated with each respective wheel brake on such vehicle to apply and release said each such respective wheel brake;
   (c) at least one solenoid valve means which includes three fluid communication ports, a first of said three fluid communication ports is connected to receive pneumatic pressure from such source and a second of said three fluid communication ports is connected to communicate said pneumatic pressure to said brake cylinder of said each respective wheel brake, said at least one solenoid valve is electrically connected to receive a control signal from said electronic control system so that upon receipt of an appropriate control signal from said electronic control system said pneumatic pressure will be one of supplied to and exhausted from said each respective wheel brake; and (d) a brake power selector positioned on such vehicle, said brake power selector including:
  (i) a pedal-operated brake valve means connected on an input side thereof to receive pneumatic pressure from such source and connected on an output side thereof to a third fluid communication port of said at least one solenoid valve means for modulating braking pressure, said brake valve means including an exhaust for sole venting of said pneumatic pressure from said brake system to atmosphere; and
  (ii) an electrical frequency selector connected to provide an input signal to said electronic control system upon actuation by an operator of such vehicle during a brake application.

2. A vehicle brake system, according to claim 1, wherein said brake system further includes a pressure sensor means, connected intermediate said at least one solenoid valve means and said brake cylinder associated with said each respective wheel brake, for providing said electronic control system with an input signal value representative of such pneumatic pressure being communicated to said brake cylinder associated with said each respective wheel brake.

3. A vehicle brake system, according to claim 1, wherein said at least one solenoid valve means is a modulating-type valve having both a pilot portion and a piloted main valve portion.

4. A vehicle brake system, according to claim 3, wherein, such pneumatic pressure, electrically modulated by said at least one solenoid valve means, is greater by a preselected value than such pneumatic pressure modulated by said pedal-operated brake valve means.

5. A vehicle brake system, according to claim 1, wherein said at least one solenoid valve means is a proportional valve.

6. A vehicle brake system, according to claim 1, wherein said brake system further includes a plurality of solenoid valve means one of said plurality of solenoid valve means being associated with a respective one of said each respective wheel brake, connected on an input side thereof to receive such pneumatic pressure from such common source, and connected on an output side to communicate such pneumatic pressure to an associated brake cylinder, each of said plurality of solenoid valve means includes a third fluid communication port connected for pneumatic pressure communication with said output side of said brake valve means.

7. A vehicle brake system, according to claim 6, wherein said brake system further includes a pressure sensor means, connected intermediate said each of said solenoid valve means and said associated brake cylinder, for providing said electronic control system with an input signal value representative of such pneumatic pressure being communicated to said associated brake cylinder.

8. A vehicle brake system, according to claim 7, wherein said brake system further includes a wheel brake anti-locking system.

9. An electrically-controlled motor vehicle brake system which responds to pneumatic pressure supplied from a common source positioned on such motor vehicle, said vehicle brake system comprising:

(a) an electronic control system positioned on such vehicle;
(b) a brake cylinder associated with each respective wheel brake on such vehicle to apply and release said each such respective wheel brake;
(c) a solenoid valve means associated with said each such respective wheel brake connected on an input side thereof to receive such pneumatic pressure from such common source and connected on an output side to communicate such pneumatic pressure to an associated brake cylinder, said solenoid valve means including an exhaust port;
(d) a brake power selector positioned on such vehicle, said brake power selector including:
  (i) a pedal-operated brake valve means connected on an input side thereof to receive pneumatic pressure from such source and connected on an output side thereof to said exhaust port of said solenoid valve means for modulating braking pressure; and
  (ii) an electrical frequency selector connected to provide an input signal to said electronic control system upon actuation by an operator of such vehicle during a brake application; and
(e) a wheel brake anti-locking system, said wheel brake anti-locking system including:
  (i) cutoff valve means having a normally open position in which said output side of said brake valve means is connected to said exhaust port of each said solenoid vlve means and an exhaust position in which said exhaust port of each said solenoid valve means is vented to atmosphere; and
  (ii) speed sensing means positioned adjacent each wheel on such vehicle including said electronic control system for providing a wheel locking signal to actuate said cutoff valve means from said normally open position to said exhaust position.

10. A vehicle brake system, according to claim 9, wherein said brake system further includes at least one axle load-sensing means for providing an input signal to said electronic control system that is representative of an axle loading on such vehicle.

11. A vehicle brake system, according to claim 10, wherein said brake system is controlled by said electronic control system as a function of one of an axle load and a wheel skid and a combination of an axle load and wheel skid, and said cutout valve comprises a plurality of solenoid valves which can be switched to an exhaust position by said electronic control system when such brakes are applied rapidly and during retarded brakings.

12. A vehicle brake system, according to claim 9, wherein said cutout valve is a solenoid valve.

* * * * *